(12) United States Patent  
Sartorius et al.

(10) Patent No.: US 7,802,055 B2  
(45) Date of Patent: Sep. 21, 2010

(54) VIRTUALLY-TAGGED INSTRUCTION CACHE WITH PHYSICALLY-TAGGED BEHAVIOR

(75) Inventors: Thomas Andrew Sartorius, Raleigh, NC (US); Rodney Wayne Smith, Raleigh, NC (US); Daren Eugene Streett, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 11/468,850

(22) Filed: Aug. 31, 2006

(65) Prior Publication Data

US 2007/0250666 A1    Oct. 25, 2007

Related U.S. Application Data

(60) Provisional application No. 60/793,016, filed on Apr. 19, 2006, provisional application No. 60/793,015, filed on Apr. 19, 2006.

(51) Int. Cl.  
*G06F 13/00* (2006.01)  
*G06F 13/28* (2006.01)  
(52) U.S. Cl. .................. 711/133; 711/141; 711/125; 711/E12.037  
(58) Field of Classification Search .............. None  
See application file for complete search history.

(56) References Cited

U.S. PATENT DOCUMENTS 5,003,459 A * 3/1991 Ramanujan et al. ........... 711/3
6,079,005 A * 6/2000 Witt et al. .................... 711/213
6,338,128 B1 * 1/2002 Chang et al. ................. 711/203
6,349,355 B1 * 2/2002 Draves et al. .................. 711/6
6,412,043 B1 * 6/2002 Chopra et al. ............... 711/118
2004/0162961 A1 8/2004 Lyon

OTHER PUBLICATIONS

International Preliminary Report on Patentability-PCT/US07/066802, The International Bureau of WIPO, Geneva Switzerland-Oct. 22, 2008.
International Search Report-PCT/US07/066802, International Search Authority-European Patent Office-Nov. 5, 2007.
Written Opinion-PCT/US07/066802, International Search Authority-European Patent Offce-Nov. 5, 2007.

* cited by examiner

*Primary Examiner*—Kevin Verbrugge  
*Assistant Examiner*—Eric S Cardwell  
(74) *Attorney, Agent, or Firm*—Peter M. Kamarchik; Nicholas J. Pauley; Sam Talpalatsky

(57) ABSTRACT

An instruction cache system having a virtually tagged instruction cache which, from a software program perspective, operates as if it were a physically tagged instruction cache is disclosed. The instruction cache system also includes a means for address translation which is responsive to an address translation invalidate instruction and a control logic circuit. The control logic circuit is configured to invalidate an entry in the virtually tagged instruction cache in response to the address translation invalidate instruction.

22 Claims, 5 Drawing Sheets

VIRTUALLY-TAGGED INSTRUCTION CACHE WITH PHYSICALLY-TAGGED BEHAVIOR

RELATED APPLICATIONS

This application claims the benefit of U.S. Provisional Application No. 60/793,016, filed Apr. 19, 2006 and U.S. Provisional Application No. 60/793,015, filed Apr. 19, 2006 which are incorporated by reference in their entirety.

FIELD

The present disclosure relates generally to processing systems, and more specifically, to virtually tagged instruction cache systems.

BACKGROUND

Common processor systems utilize the concept of address translation in a processor pipeline to change the address of a page of data or instructions from its virtual storage address to its real, physical storage address. One means of address translation utilizes a translation lookaside buffer (TLB) which conventionally stores many entries where each entry includes an application space identifier (ASID) also referred to as a process identifier (PID), a virtual address tag (VT), and a physical page number (PPN). Thus, the translation lookaside buffer contains the mapping between a virtual address with a physical address. In its simplest form, the processor pipeline receives as input a virtual address of an instruction, compares a portion of the virtual address with the entries in the TLB to find a matched entry, and replaces the portion of the virtual address with the physical page number associated with the matched entry to form a physical address. A given mapping of a physical address to a virtual address generally covers a range of the virtual and physical address space, this range being referred to as a "page", with the size of a page generally being greater than the size of a cache line in an instruction cache, such that several cache lines may all be associated with the same page of the virtual or physical address space.

Common processor systems also include one or more instruction caches which store recently used instructions in fast on-chip memory to minimize the delay resulting from fetching instructions from slower off-chip memory. An instruction cache may be indexed to efficiently look up an entry. The term "indexed" as used in relation to instruction caches means a set of bits in either a virtual address or physical address which are utilized to specify a set in a set-associative instruction cache or a row in a directly mapped instruction cache. An instruction cache indexed by bits within a virtual address is known as a virtually indexed cache. An instruction cache indexed by bits within a physical address is known as a physically indexed cache.

Entries in an instruction cache may be tagged with a key which is compared with either a portion of a physical address or a portion of a virtual address. An instruction cache tagged with a portion of a physical address is known as a physically tagged instruction cache. An instruction cache tagged with a portion of a virtual address is known as a virtually tagged instruction cache. A processor designer chooses how an instruction cache is both indexed and tagged. Conventional instruction caches may be either virtually indexed virtually tagged (VIVT), virtually indexed physically tagged (VIPT), or physically indexed physically tagged (PIPT). Through address translation, a virtual address is converted to a physical address which may be utilized to look up an entry in a physically tagged instruction cache or to access real memory in the case of an instruction cache miss.

In addition to a virtual address tag, conventional virtually tagged instruction caches commonly include an ASID or a PID tag. This tag allows the processor system to discriminate whether an address entry is valid for the active software process. For example, if the processor system is executing instructions associated with a software process having ASID 'x', a successful cache match would require matching both the ASID tag and the virtual address instruction tag. Because of various scenarios such as swapping of an active ASID, that is, replacing one process using a given ASID value with a new process using that same ASID value, virtually tagged instruction caches may have one or more entries that become obsolete and are no longer valid. Since cache hits save processors time from fetching instructions from memory, processor system designers desire cache coherency, a cache whose contents reflect valid, non-obsolete instructions. To maintain cache coherency, entries in a cache are commonly invalidated in response to common instruction cache invalidate instructions issued by a software application. The amount of management of an instruction cache required by the software application is dependent on whether the instruction cache is virtually tagged or physically tagged. Since one or more virtual addresses may map to a given physical address, alias and synonym problems may exist in a conventional virtually tagged instruction cache.

The alias problem occurs when two or more I-cache entries containing different virtual address/ASID combinations map to the same physical address. These different combinations may occur due to any of the following three reasons. First, the virtual address of two or more I-cache entries may be literally different but part of the same software process having the same ASID field value. Second, the virtual addresses of two or more I-cache entries may be the same but associated with different software processes and, thus, associated with different ASID field values. Third, the virtual addresses of two or more I-cache entries may all be different and associated with different software processes, thus, associated with different the ASID values. In any of these three cases, the different combinations can map to the same physical address. As a result of this alias problem, conventional virtually tagged instruction caches impose a burden on a software application to issue I-cache invalidate instructions for more scenarios than required by a physically tagged instruction cache. For example, a software application written to virtually tagged instruction caches would have to issue instruction cache invalidate instructions to invalidate each virtual address in the instruction cache that may be associated with a physical address that has itself become invalid or been modified.

The synonym problem refers to two or more I-cache entries that are located at different virtual indices of the I-cache, but which are associated with the same physical address. The synonym problem may occur in conventional virtually-indexed I-caches regardless of whether those I-caches are virtually or physically tagged.

Virtually-tagged instruction caches also impose another additional burden on software for invalidating I-cache entries, relative to physically-tagged instruction caches. Specifically, when the mapping for the combination of a given ASID and page of the virtual address space is changed from one physical address to another, all of the I-cache entries in a virtually-tagged I-cache that are associated with that combination of ASID and page of the virtual address space are no longer valid, since the I-cache may have cached the contents of the old physical memory locations associated with the old mapping, rather than the contents of the new physical memory locations associated with the new mapping. This is true even though the actual contents of the underlying old and new physical memory locations may not have changed. Therefore, software written to manage a virtually-tagged instruction cache must execute instruction cache invalidate operations to invalidate all instruction cache entries that might be associated with the combination of ASID and page of the virtual address space for which the mapping was changed.

In a processor with a virtually tagged instruction cache, address translation may be performed in a pipeline in parallel with looking up instructions from the virtually tagged instruction cache. Thus, this parallelism provides advantageous power, frequency, and instruction throughput when virtually tagged instruction caches are utilized. Therefore, there is a need for an instruction cache system and methods which achieve the advantages of a conventional virtually tagged instruction cache while eliminating the additional burden placed on software applications by conventional virtually tagged instruction caches with regard to managing entries and do not impose added requirements to software applications.

SUMMARY

One aspect of the disclosure recognizes an instruction cache system having the advantages of both a virtually tagged instruction cache and a physically tagged instruction cache. This aspect of the present invention utilizes a virtually tagged instruction cache which, from a software program perspective, operates as a physically tagged instruction cache.

Another aspect of the disclosure recognizes that virtual addresses or portions thereof are utilized as tags in both an address translation means and a virtually tagged instruction cache. With this recognition, invalidate instructions directed to the address translation means may additionally be utilized to invalidate entries in the virtually tagged instruction cache.

In another aspect of the disclosure, an instruction cache system includes a virtually tagged instruction cache, a means for address translation and a control logic circuit. The means for address translation is responsive to an address translation invalidate instruction. The control logic circuit is configured to invalidate an entry in the virtually tagged instruction cache in response to the address translation invalidate instruction.

In yet another aspect, a method for a virtually tagged instruction cache to operate as if it were a physically tagged instruction cache from a software program point of view is disclosed. The method includes receiving an address translation invalidate instruction and invalidating an entry in a virtually tagged instruction cache in response to the address translation invalidate instruction.

In a further aspect, a control logic circuit for directing a virtually tagged instruction cache to operate as if it were a physically tagged instruction is disclosed. The control logic circuit includes a first input for receiving an address translation invalidate instruction and a means for generating control signals to invalidate an entry in the virtually tagged instruction cache in response to the address translation invalidate instruction.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
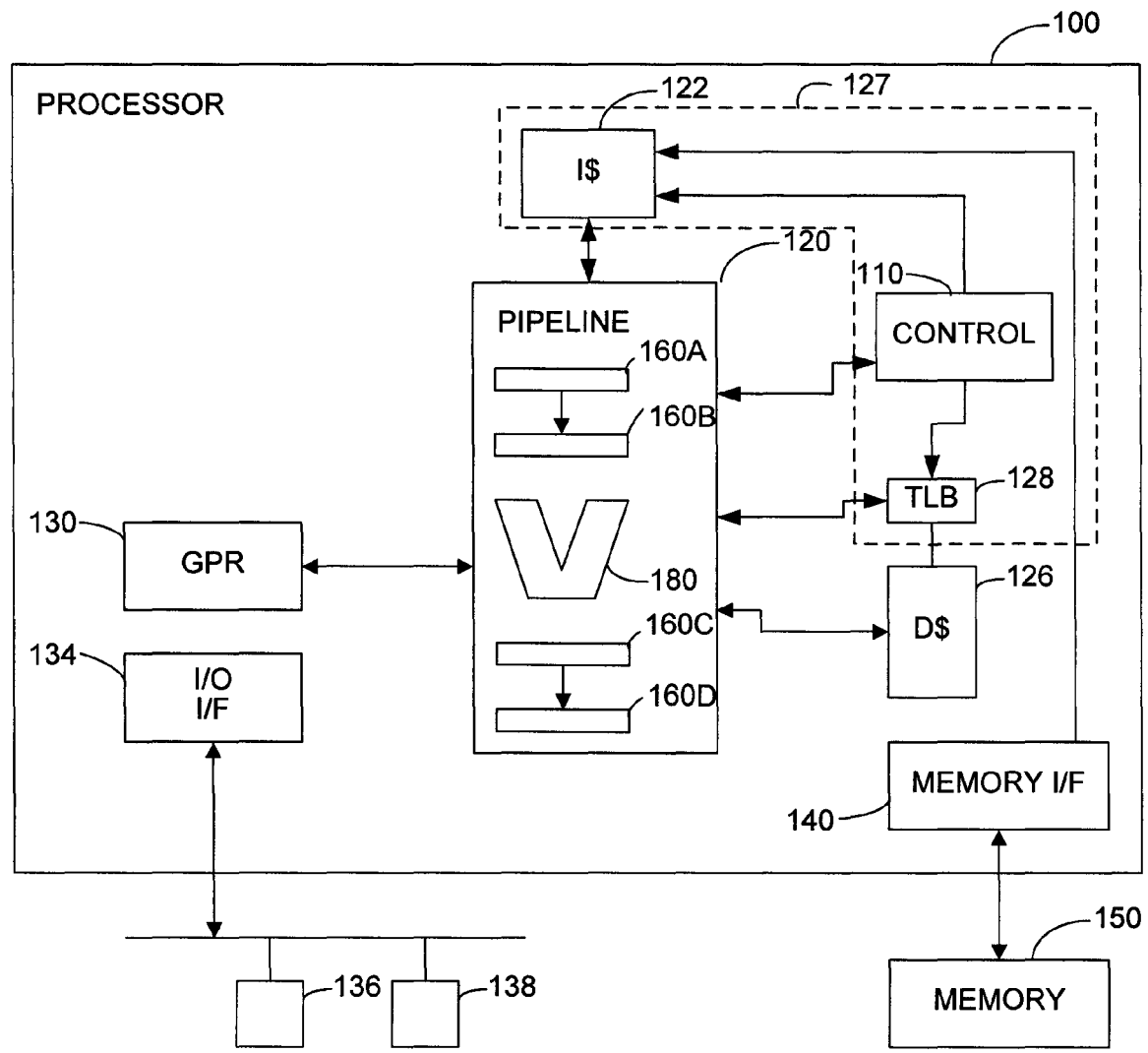
FIG. 1 is a functional block diagram of one embodiment of a processor.

FIG. 1 depicts a functional block diagram of a processor 100. The processor 100 executes instructions in an instruction execution pipeline 120 according to control logic circuit 110. The processor 100 may be any type of pipelined processor component including, by way of example, a microprocessor, a digital signal processor (DSP), a bridge, programmable logic, discrete gate or transistor logic, or any other information processing component. In some embodiments, the pipeline 120 may be a superscalar design, with multiple parallel pipelines. The pipeline 120 includes various registers or latches 160A-D, organized in pipe stages, and one or more execution units 180. Although five pipe stages are depicted in FIG. 1, it is recognized by those skilled in the art that pipe stages greater than or less than the illustrated pipe stages may be included in processor 100. A General Purpose Register (GPR) file 130 provides registers comprising the top of the memory hierarchy. The processor 100 includes an instruction cache system 127 which includes a virtually tagged instruction cache (I-cache) 122, a Translation Lookaside Buffer (TLB) 128, and control circuit 110.

The pipeline 120 fetches instructions from the I-cache 122 by providing a virtual address to the I-cache 122. Memory address translation is managed by the TLB 128. In parallel with providing a virtual address to I-cache 122, the pipeline 120 provides the virtual instruction address to the TLB 128 to determine the corresponding physical address which would be utilized to access memory 32 through memory interface 30 if a the virtual address is not found (cache miss) in the I-cache 122. The control logic circuit 110 receives invalidation instructions from pipeline 120 and manages invalidating one or more entries in the I-cache 122 and the TLB 128. The structure and operation of the instruction cache system 127 are described more fully in connection with the discussion of FIG. 2.

Data is accessed from a data cache (D-cache) 126, with memory address translation and permissions managed by Translation Lookaside Buffer (TLB) 128. Although FIG. 1 depicts the TLB 128 as an integrated TLB, in various embodiments, the TLB 128 may be segregated into multiple TLBs where one is dedicated to translating accesses to the D-cache 126 and the other is dedicated to translating accesses to I-cache 122. Misses in the I-cache 122 and/or the D-cache 126 cause an access to main (off-chip) memory 150, under the control of a memory interface 140. Such access to main memory utilizes the physical address retrieved from the TLB 128.

The processor 100 may include an Input/Output (I/O) interface 134, controlling access to various peripheral devices 136 and 138. Those of skill in the art will recognize that numerous variations of the processor 100 are possible. For example, the processor 100 may include a second-level (L2) cache for either or both the I-cache 122 and D-cache 126. In addition, one or more of the functional blocks depicted in the processor 100 may be omitted from a particular embodiment.

Figure 2:
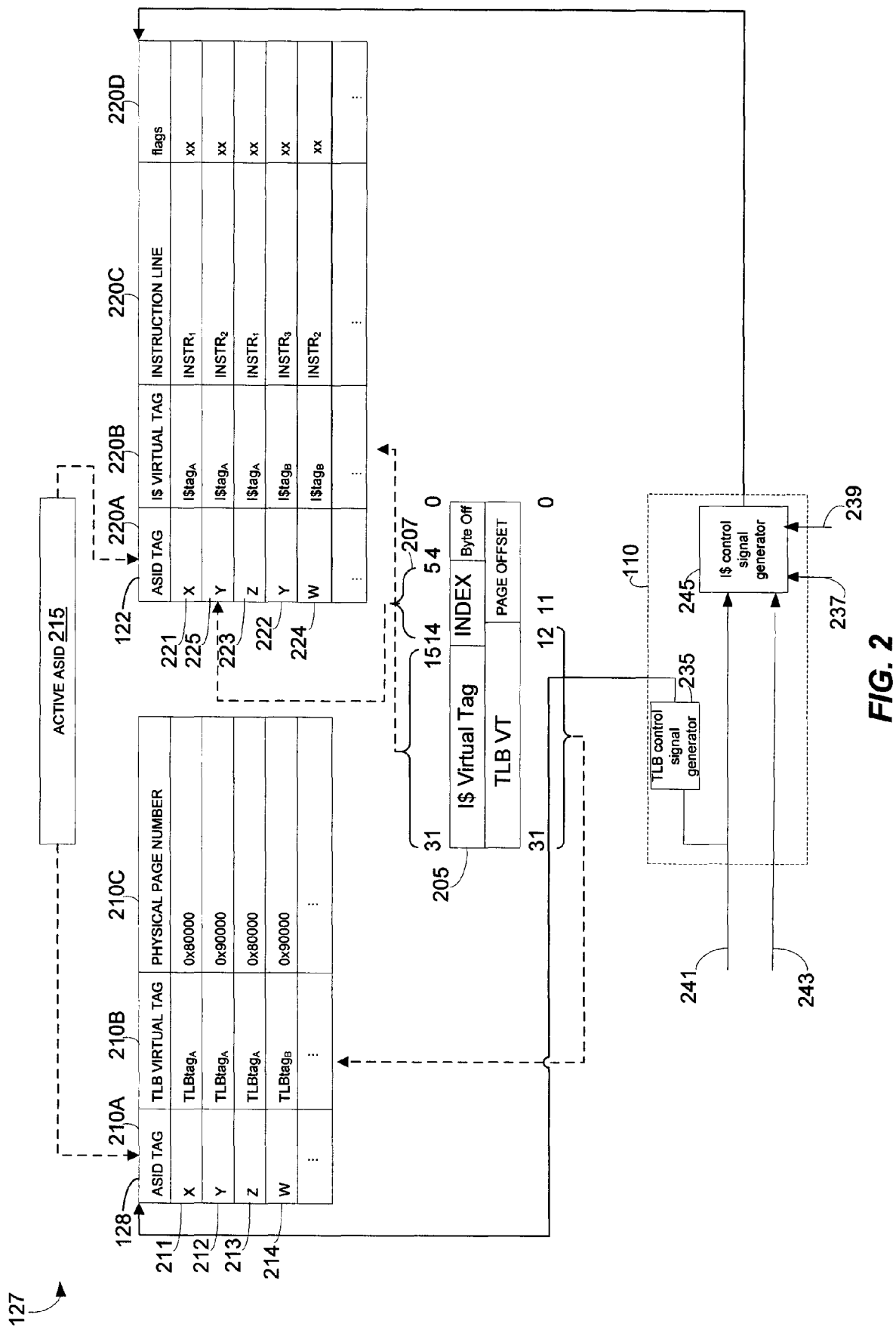
FIG. 2 is a more detailed depiction of the instruction cache system of FIG. 1.

FIG. 2 is a more detailed depiction of the instruction cache system 127 of FIG. 1. In this exemplary embodiment, the TLB 128 is configured to have three columns 210A-210C. Column 210A contains the application space identifiers (ASIDs) associated with software processes. Register 215 contains the ASID of the currently executing software process which may be stored in a dedicated register or in the GPR file 130. Column 210B contains TLB virtual tags. A TLB virtual tag is a portion of a virtual address. For example, virtual address 205 is a 32-bit address stored in a register such as a program counter (PC) register. In this example, bit positions 31-12 define the portion of the virtual address defining the TLB virtual tag.

Column 210C contains 20 bit physical page numbers (PPNs) corresponding to an ASID/TLB virtual tag combination. A physical page number is returned from TLB 128 when an active ASID (associated with an executing software process) and TLB virtual tag from a virtual address 205 match the combination of ASID tag and TLB virtual tag stored in a row of TLB 128. The returned PPN is concatenated with the page offset to define the corresponding physical address. In particular, during concatenation, the returned PPN is placed in bit positions 31-12 while the page offset portion of the virtual address continues to occupy bit positions 11-0.

In this exemplary embodiment, virtually tagged I-cache 122 is 32 KB direct-mapped cache with 1024 "1-line sets" and 32-byte lines. In this embodiment, the virtually tagged I-cache 122 is configured to have four columns 220A-220D. Column 220A contains the application space identifiers (ASID) associated with software processes. Column 220B contains I-cache (I$) virtual tags. Column 220C contains a 32 byte instruction line associated with a particular I-cache virtual tag and ASID combination. Optionally, column 220D contains flags indicating under what condition an associated entry in the I-cache was stored in order to limit the scope of subsequent entry invalidation.

Virtual Address 205 is depicted showing two superimposed meanings for its bit positions. When virtual address 205 is utilized by virtually-tagged I-cache 122, bit positions 31-15 define the I-cache (I$) virtual tag, bit positions 14-5 define an index 207 to select one line or set out of the 1024 "1-line sets" in I-cache 122, and bit positions 4-0 define an offset in an instruction line column 220C. A row in directly mapped I-cache 122 is also referred to as a "1-line set." Although eight 32-bit instructions, for example, may reside in a single instruction line, one instruction per I$ virtual tag is illustrated for simplicity. It is recognized that other instruction sizes are contemplated by this disclosure. When virtual address 205 is utilized by TLB 128 for address translation, bit positions 31-12 define a TLB virtual tag and bit positions 11-0 define a page offset.

During an I-cache lookup for a specified virtual address, the index 207 from the virtual address selects a corresponding line in the I-cache 122. The active ASID 215 and bit positions 31-15 of the specified virtual address are then compared with the ASID tag and I$ virtual tag stored in the selected cache line.

Similarly, during a TLB translation for a specified virtual address, the active ASID 215 and bit positions 31-12 of the specified virtual address are compared with ASID tags and TLB virtual tags stored in TLB 128 to find a match and, thus, a corresponding PPN.

Although not illustrated here, in certain embodiments, the portion of a virtual address comprising a TLB virtual tag may be the same portion of the virtual address comprising an I-cache virtual tag. It is recognized by those skilled in the art that although virtually tagged I-cache 122 is illustrated as a directly mapped cache, I-cache 122 may also be embodied as a set associative cache in order to access groups of entries in the form of multi-line sets.

Returning to TLB 128, both an alias relationship and differentiation relationship are depicted. An alias relationship occurs when the same physical page number (PPN) is located in two or more entries in TLB 128. For example, entries 211 and 213 both reference PPN 0x80000. In this example, entries 211 and 213 have the same TLB virtual tag but are associated with a different software process to make the ASID tag/TLB virtual tag combination unique. Entries 212 and 214 are also aliases of each other because they both reference PPN 0x90000. With respect to each other, entries 212 and 214 have unique TLB virtual tags and unique ASID tags in order to define a unique ASID/TLB virtual tag combination. A differentiation relationship occurs when the same TLB virtual tag maps to two or more different physical page numbers. Entries 211 and 212 depict a differentiation relationship because the same TLB virtual tag (TLBtag$_A$) maps to two different physical page numbers, 0x80000 and 0x90000 respectively.

Recognizing that TLB virtual tags and I$ virtual tags are composed of bit positions in a virtual address (some of which are common bit positions), entries in the TLB 128 are related to entries in the I-cache 122. Consequently, for nomenclature sake, the use of a subscript when referring to a particular I$ virtual tag (e.g. I$tag$_A$) indicates that the value of the particular I$ virtual tag correlates to the value of a TLB virtual tag having the same subscript (e.g. TLBtag$_A$). In the exemplary embodiment of FIG. 2, TLB virtual tags contain more bits than I$ virtual tag. Consequently, one TLB virtual tag may correspond to one or more I$ virtual tags. Thus, one TLB entry having a physical page number may correspond to one or more I-cache entries meaning that the instruction or instructions in the I-cache 122 may also be physically located in the physical page number of the corresponding TLB entry. For simplicity, it should be noted that all the I-cache entries related to a particular TLB entry are not illustrated. Given the one to many relationship described above between TLB entries and I-cache entries, if a given I-cache row is associated with the same ASID tag and a virtual address tag value in a given TLB row, then the instruction or instructions in the given I-cache row may additionally be located within the page of physical address space corresponding to the page of virtual address space associated with the given TLB row.

Over time the entries of both the TLB 128 and I-cache 122 may become obsolete. For example, if an ASID is re-used by a subsequent unrelated software program, and the virtual to physical mappings of the subsequent program are different than those of the previous program, then entries in both the TLB and I-cache containing the re-used ASID would no longer be valid because they would be mapped to the physical addresses associated with the previous software program. To maintain TLB and cache coherency, control logic circuit 110 is utilized to manage obsolete entries in both the TLB 128 and the I-cache 122. In general, software programs written for a physically tagged I-cache can be simpler than those written for a virtually-tagged I-cache with respect to managing obsolete entries in the I-cache for various reasons including that the alias problem does not exist in a physically tagged I-cache and that the mere changing of the virtual to physical address mappings does not require I-cache invalidation in a physically-tagged I-cache. However, software programs written for both physically-tagged I-caches and those written for virtually-tagged I-caches must include explicit TLB invalidate instructions when changing the mapping of a given virtual address for a given process ID from one physical address to another.

There are two main classes of scenarios where entries of an I-cache should be invalidated with a virtually-tagged instruction cache. The first class of scenarios involves address mapping changes where, for example, a virtual address becomes mapped to a different physical address. In conventional virtually-tagged I-cache implementations, I-cache invalidate instructions are utilized to invalidate the I-cache under this class of scenarios. Furthermore, in the first class of scenarios, TLB invalidate instructions are utilized to invalidate a TLB in both conventional virtually tagged I-cache and conventional physically tagged I-cache implementations. The second class of scenarios involves the situation where the content of physical memory is changed. In the second class of scenarios, I-cache invalidate instructions are utilized to invalidate the I-cache in both conventional virtually tagged I-cache and conventional physically tagged I-cache implementations. However, in conventional physically tagged I-cache implementations, an I-cache invalidate instruction need only identify the physical address of changed memory to invalidate as opposed to all possible virtual addresses which might pertain to that physical address in a conventional virtually tagged I-cache implementation.

Control logic circuit 110 is configured to recognize that the first class of scenarios which would conventionally require software programs to invoke explicit I-cache invalidation for a virtually-tagged I-cache also requires software programs to invoke TLB invalidation even for a physically-tagged I-cache. For example, one scenario includes the situation when an ASID/TLB virtual tag combination is mapped to a new physical page number. In this scenario, control logic circuit 110, in response to an explicit TLB invalidate instruction, invalidates entries in the TLB 128 involving the ASID/TLB virtual tag combination and also invalidates entries in the virtually tagged I-cache 122 involving the ASID/I-cache virtual tag combination. In certain embodiments, the explicit TLB invalidate instruction causes flash invalidation of all the entries in the I-cache 122 regardless of the specified ASID/TLB virtual tag combination.

With regard to the second class of scenarios addressing modifications made to the content of a specified physical address, a software program issues an explicit I-cache invalidation instruction to cause I-cache 122 to be updated. The contents of the explicit I-cache invalidation instruction may or may not specify a virtual address associated with the modified physical address or the modified physical address.

In one embodiment, the control logic circuit 110, in response to this explicit I-cache invalidation instruction, is configured to flash invalidate all entries in the virtually tagged I-cache 122. In this embodiment, a virtual address associated with the given physical address, or alternatively the given physical address, can be specified in the explicit I-cache invalidation instruction. However, since all the I-cache entries are flash invalidated, the specified virtual or physical address of the explicit I-cache invalidation instruction is simply ignored.

In an alternative embodiment, the control logic circuit 110, in response to the explicit I-cache invalidation instruction, is configured to selectively invalidate entries in the virtually tagged I-cache 122. Since I-cache entries, in general, have virtual tags that correspond with a physical address, I-cache entries that may correspond to the specified physical address would have to be invalidated. Refer to entries in rows 212 and 214 in TLB 128 for an example of the identification of multiple virtual addresses for which the corresponding virtually-tagged I-cache entries would need to be invalidated, as a result of a change to the content of a physical address. These entries are alias entries and are mapped to the same physical page number 0x90000.

Similarly, I-cache entries 225 and 224 contain instructions which are also found at a physical address defined by the first 17 bits of the physical page number because the value of I$ virtual tags (I$tag$_A$ and I$tag$_B$) are related to the value of TLB virtual tags (TLBtag$_A$ and TLBtag$_B$), respectively, as illustrated by dual superimposed meaning of bit positions of virtual address 205 discussed above. Consequently, if, for example, the contents of physical address 0x9000_0000 change, entries 225 and 224 along with any other entries not illustrated whose instructions are also found at physical address 0x9000_0000 will be selectively invalidated by control logic circuit 110. More particularly, in this embodiment of selectively invalidating entries in the virtually tagged I-cache 122, control logic circuit 110 is configured to invalidate all entries associated with particular I-cache virtual indexes at which the specified physical address might reside such as all entries in the selected I-cache sets.

Figure 3:
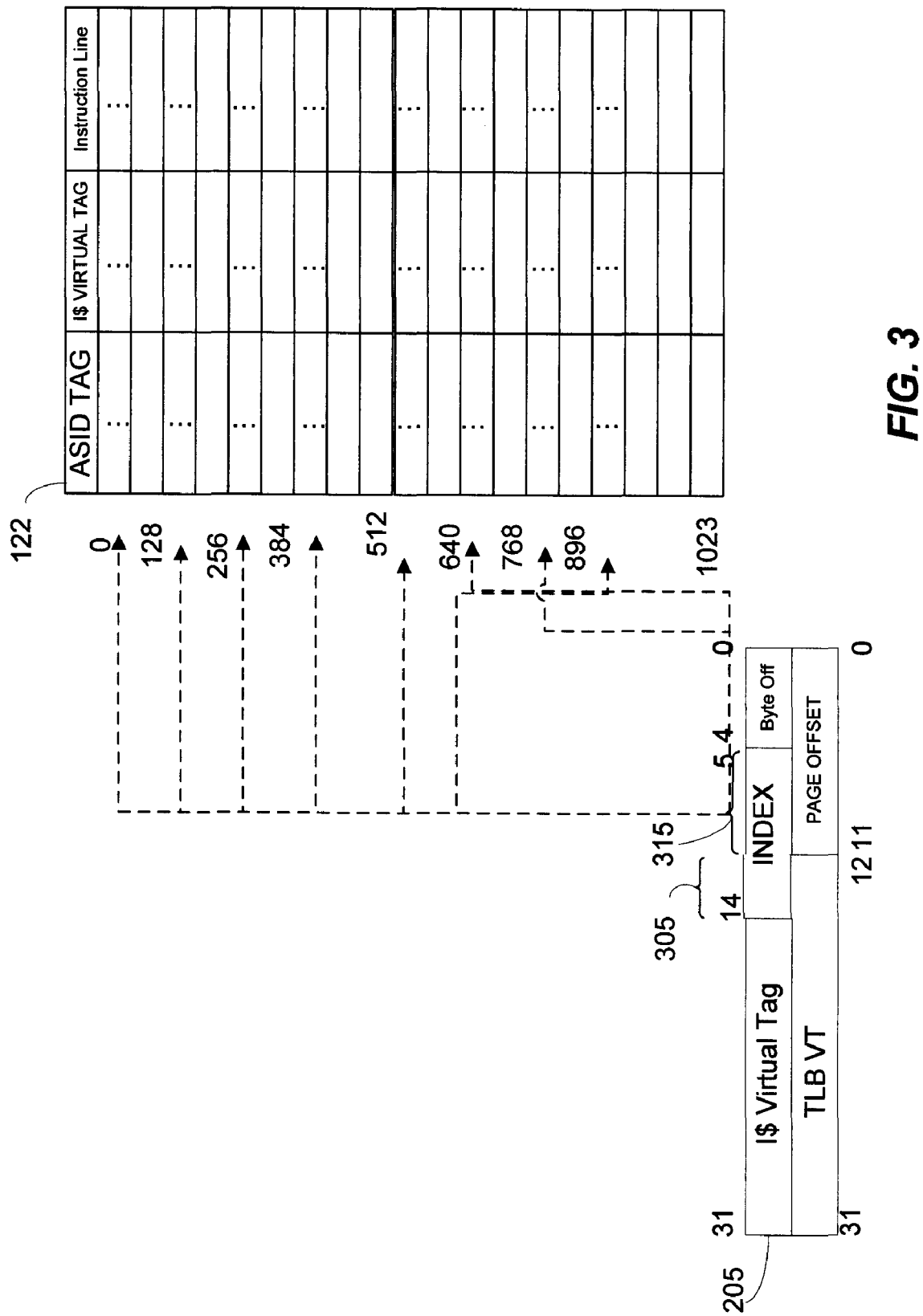
FIG. 3 is a block diagram illustrating selective invalidation of a set of virtually tagged I-cache entries which might be associated with a physical address in a directly mapped I-cache.

FIG. 3 is a block diagram illustrating selective invalidation of a set of virtually tagged I-cache entries which might be associated with a physical address in a directly mapped I-cache 122. As depicted in virtual address 205, bit positions 14-12 or reference 305 are part of the index bits, also referred to as I-cache index bits, when virtual address 205 is utilized by the virtually-tagged I-cache 122. Bit positions 14-12 are also part of the TLB virtual tag. However, since bit positions 14-12 are translated bits during address translation, these same bits are part of the physical page number corresponding to virtual address 205. Since bit positions 14-12 are not utilized by the I$ virtual tag and a physical page number may be specified for invalidation, each combination of bits 14-12 define thresholds 0, 128, 256, . . . 896 within the virtually tagged I-cache 122 where an associated I-cache entry corresponding to the physical page number might be located. The remaining index bits, bits 11-5 or reference 315, are not translated during address translation and, thus, are common between virtual address 205 and its translated physical address. Consequently, bits 11-5 specify an offset from the defined thresholds to locate corresponding I-cache entries potentially related to the physical page. Since reference 305 contains three bits, control logic circuit 110, in response to a physical address being invalidated, may be configured to simultaneously invalidate eight entries in the virtually tagged I-cache 122 by concatenating each combination of bits 14-12 with bits 11-5 of the physical address.

In general, since bits 11-0 do not get translated by address translation, they do not vary between a specified physical address and any virtual addresses which could translate to that physical address. In other words, all virtual addresses which may map to the specified physical address must match the physical address in bits 11-0. Therefore, any bits from those in positions 11-0 which are used as part of the I-cache index to select an I-cache set that might contain entries corresponding to the specified physical address, must have the same value as the corresponding bits from the physical address. It is only those I-cache index bits in positions 14-12, for example, which could take on a different value than the corresponding bits from the physical address, yet still identify a set of entries possibly containing entries corresponding to the specified physical address.

In response to an explicit I-cache invalidation instruction identifying a physical address to be invalidated from the I-cache due to the contents of that physical address having been changed, the control logic circuit 110 utilizes bit positions 11-5 to determine offsets from the thresholds defined by bits 14-12 to invalidate all entries in the translated set of qualified entries in the I-cache, allowing the I-cache to be invalidated on a set basis rather than on an entire I-cache basis. With a single instruction specifying a physical address to be invalidated or, alternatively, a virtual address associated with the invalid physical address, this embodiment enables software written to a physically tagged I-cache model to automatically invoke the I-cache invalidate operation on a virtually tagged I-cache to ensure that all possible virtual address aliases to the specified physical address get removed from the cache. As described, such removal may be on a line, set, or entire cache basis. In this fashion, the virtually-tagged I-cache is properly managed without any additional burden on the software that was written to the physically-tagged I-cache model.

Figure 4:
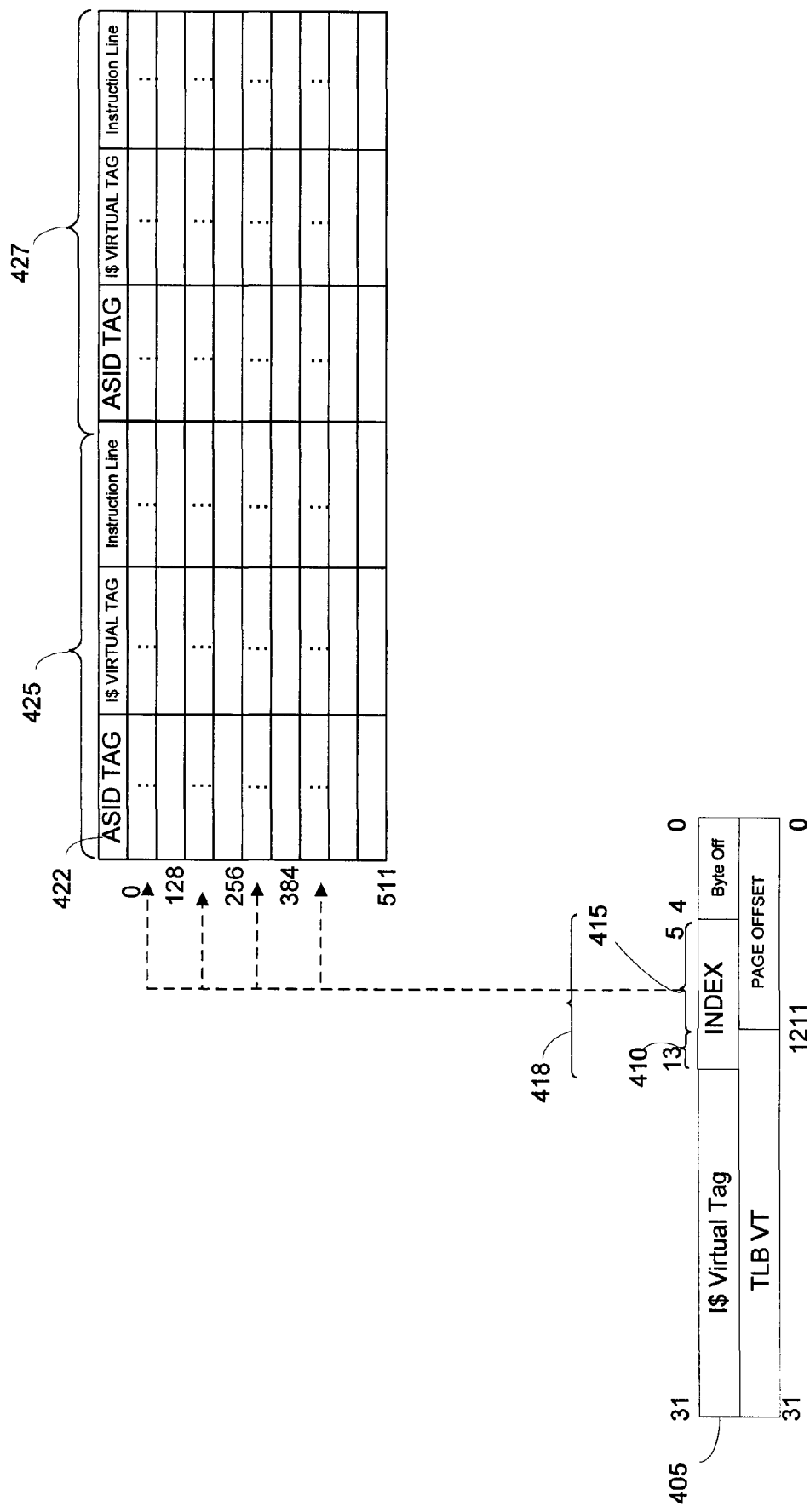
FIG. 4 is a block diagram illustrating selective invalidation of a set of virtually tagged I-cache entries which might be associated with a physical address in a two-way set associative I-cache.

The number of simultaneous indexes into the virtually tagged I-cache 122 by control logic circuit 110 is dependent on the set associativity of a virtually-tagged I-cache. FIG. 4 is a block diagram illustrating selective invalidation of a set of virtually tagged I-cache entries which might be associated with a physical address in a two-way set associative I-cache 422. Other than its associativity, two-way associative I-cache 422 is a 32 KB virtually-tagged I-cache with 32-byte lines and may suitably be similar to I-cache 222. Virtual address 405 is a 32-bit address stored in a register such as a program counter (PC) and, similar to virtual address 205, is depicted showing two superimposed meanings for its bit positions. I-cache 422 has an index 418 having a size of nine bits and, thus, an I$ virtual tag having a size of 18 bits. For this embodiment, bit positions 13-12 or translated bit positions 410 would define four thresholds, resulting in four simultaneous indexes, and bit positions 11-5 or non-translated bit positions 415 would define an offset from each of the four thresholds to selectively invalidate rows in the virtually-tagged I-cache. In a two-way set associative cache, each row includes two cache lines. Consequently, control logic circuit 110 simultaneously indexes four cache rows and, thus, invalidates eight virtually tagged I-cache entries.

It is recognized that various sizes and configurations of virtually tagged I-caches are contemplated as additional embodiments. By way of example, a 4-way set associative embodiment of a 32 KB virtually-tagged I-cache with 32-byte lines would result in an index having a size of eight bits and, thus, an I$ virtual tag having a size of 19 bits. For a 4-way set associative I-cache, bit position 12 would define two thresholds and bit positions 11-5 would define the offset from the two thresholds to selectively invalidate entries in the 4-way I-cache.

By way of another example, an 8-way set associative embodiment of a 32 KB virtually-tagged I-cache with 32-byte lines would result in an index having a size of seven bits and, thus, an I$ virtual tag having a size of 20 bits, the same size of a TLB virtual tag and, for that matter, a physical page number. For an 8-way set associative I-cache, there are no thresholds defined and bit positions 11-5 would index into the 8-way cache. Note, however, that each row in an 8-way cache comprises 8 cache lines, eight cache lines are selectively invalidated. Furthermore, since in this example the TLB virtual tag size is equal to the I$ virtual tag size, any entries in the I-cache which could be associated with the specified physical address are guaranteed to be located in the I-cache way selected by the single I-cache index, which in turn is the same as the index bit positions from the specified physical address since those bit positions are not translated. In other words, when all the I-cache index bits are in bit positions within a page offset, thus, the I-cache index bits do not get translated by the address translation mechanism, any entries in the I-cache which could be associated with the specified physical address are guaranteed to be located in the I-cache way selected by that single I-cache index.

These previous examples demonstrate how a set associative virtually-indexed and virtually tagged I-cache in accordance with the teachings of this disclosure affects selective invalidation. In particular, the higher the set associativity of the virtually-indexed and virtually-tagged cache, the lower the number of bits that are translated by the address translation process but which are utilized in their untranslated form in the index of the I-cache, resulting in a lower number of I-cache rows being selectively invalidated. Similarly, the size of a physical page affects the number of address bits that get translated. As the page size is increased, fewer upper-order bits of the virtual address are translated. Therefore, the larger the page size, the lower the number of bits that are translated by the address translation process but which are utilized in their untranslated form for the index of the I-cache, again resulting in a lower number of I-cache row/sets being selectively invalidated.

In the case where the number of bits in the physical page number is the same as the number of bits in the I-cache virtual tag, there are no bits 305 in the I-cache index which ultimately undergo translation by the address translation process. Thus, the set of potential I-cache ways is reduced to one guaranteed way. In general, the increase in page size results in less translation bits and, thus, the size of potential I-cache entries associated with the physical address is reduced.

Returning to FIG. 2, control logic circuit 110 receives, as input, invalidate instructions such as TLB Invalidate Instructions and I-cache Invalidate Instructions from a software program regardless of whether the software program was written with a physically tagged I-cache or a virtually tagged I-cache. These invalidate instructions may be provided from a decode stage in pipeline 120 such as pipe stage 160B, for example. Control logic circuit 110 responds to a set of TLB Invalidate Instructions to invalidate one or more entries in the I-cache 122 utilizing known mechanisms such as generating I-cache control signals for invalidating one or more entries of an I-cache in response to known I-cache invalidate instructions. By responding to the set of TLB Invalidate Instructions to additionally manage the I-cache and responding to the I-cache invalidate instruction for the scenario indicating that the contents of a physical address have changed, the control logic circuit 110 relieves the burden of a software program from having to issue I-cache invalidate instructions separately for each scenario a conventional virtually tagged I-cache requires. Consequently, software programs which are written to manage physically tagged I-cache may now advantageously execute on processor 100 managing the virtually-indexed, virtually-tagged I-cache such that it behaves as if it were physically-indexed and physically-tagged, from the perspective of the software.

Control logic circuit 110 also responds to known I-cache Invalidate Instructions to invalidate one or more entries in the virtually tagged I-cache 122 in order for existing software programs which are written to manage a virtually tagged I-cache. Additionally, in certain embodiments, control logic circuit 110 may receive an optional enable signal 237 from processor 100 which may be utilized if software programs specifically written for a virtually tagged I-cache are executing. The enable signal 237 may be invoked as a result of a processor state bit, a configuration bit, and the like. When the enable signal 237 is invoked, control logic circuit 110 operates as described above. When the enable signal 237 is not invoked (disabled), control logic circuit 110 will respond to TLB Invalidate Instructions to invalidate one or more entries from TLB 128 and will respond to I-cache Invalidate Instructions to invalidate one or more entries in the virtually tagged I-cache 122. When the enable signal 237 is not invoked (disabled), control logic circuit 110 will not invalidate entries in the virtually tagged I-cache 122 in response to TLB Invalidate Instructions, and will not necessarily invalidate more I-cache entries than those specifically associated with a specified virtual address, in response to I-cache invalidate instructions.

In certain embodiments, control logic circuit 110 may include a TLB control signal generator 235, and an I-cache control signal generator 245. The inputs 241 and 243 to the I-cache control signal generator 245 respectively couple TLB Invalidate Instructions and I-cache Invalidate instructions to the I-cache control signal generator 245. The I-cache control signal generator 245 is configured to generate control signals to invalidate one or more entries in the virtually tagged I-cache 122 based on the received invalidate instruction. The TLB control signal generator 235 generates control signals in a known manner to invalidate one or more entries in the TLB 128 based on the particular type of TLB Invalidate Instruction received. When input to the I-cache control signal generator 245 is a result of an I-cache Invalidate Instruction, the I-cache control signal generator 245 generates control signals in a known manner to invalidate one or more entries in the virtually tagged I-cache 122. Additionally, the I-cache control signal generator 245 generates control signals to invalidate one or more entries in virtually tagged I-cache 122 in response to TLB Invalidate Instructions. The following table describes the functional behavior of the I-cache control signal generator 245 resulting from receiving the following TLB Invalidate Instructions:

TABLE 1

| TLB Invalidate Instructions | I-Cache Control Signal Generator Behavior |
| --- | --- |
| Invalidate All TLB Entries (TLBIALL) | Generate control signals to flash invalidate entire I-cache 122. For example, generate the same control signals as does a known ICIALL instruction. |
| Invalidate TLB Entries associated with an ASID (TLBIASID) | Generate control signals to invalidate all entries in I-cache 122 associated with the ASID carried in the TLB Invalidate By ASID instruction. Alternatively, generate signals to flash invalidate the entire I-cache 122. |
| Invalidate TLB entry by Virtual Address (TLBIVA) | Generate control signals to flash invalidate the entire I-cache 122. |

Column 220D is one embodiment to ensure there is no errant "match" on an entry in the I-cache 122 based on a virtual tag comparison, when the entry was established at a time when the translation mechanism was in one state of enablement, but the match is occurring at a later time when the translation mechanism is in another state of enablement. For example, in the situation where a translation mechanism such as TLB 128 has an enablement feature which allows the TLB 128 to be in an enabled or disabled state, entries stored in the I-cache 122 may contain a flag value indicating whether the TLB was operative or not at the time the entry was stored. When an entry is stored in the I-cache during an inoperative TLB 128, the stored entry is associated with a physical address which is the same as the untranslated virtual address.

In the case where the TLB transitions from being disabled to enabled, the I-cache entries which were stored during the inoperative TLB are invalidated by the control logic circuit 110, in response to TLB transition signal 239. Also, in the case where TLB transitions from being enabled to disabled, the I-cache entries which were stored during the operative TLB are invalidated by the control logic circuit 110, in response to the TLB transition signal 239. The TLB transition signal 239 is commonly generated when TLB 128 transitions from being disabled to enabled and vice-versa. In particular, the I-cache control signal generator 245, in response to the TLB transition signal 239, generates control signals to invalidate entries in the I-cache 122 which match the flag field indicating the entries were initially stored while the TLB 128 was in the state from which it has just been transitioned. In an alternative embodiment, the flags of column 220D may be set when the translation table's state is enabled. In this embodiment, when an I-cache lookup is made, the flags are considered to determine if there is a match with the current state of the translation table.

In another alternative embodiment, the problem of ensuring that no errant "match" occurs on an I-cache entry established at a previous inconsistent state is addressed without optional column 220D. In this embodiment, the control logic circuit 110 flash invalidates the entire cache 122 when the TLB enable transition signal 239 indicates that there has been a transition in the TLB enable mechanism.

It should be recognized by those skilled in the art that the size of the virtual address 205 and the dimensions of the TLB 128 and the I-cache 122 may be applied to other embodiments without departing from the teachings of the invention.

Figure 5:
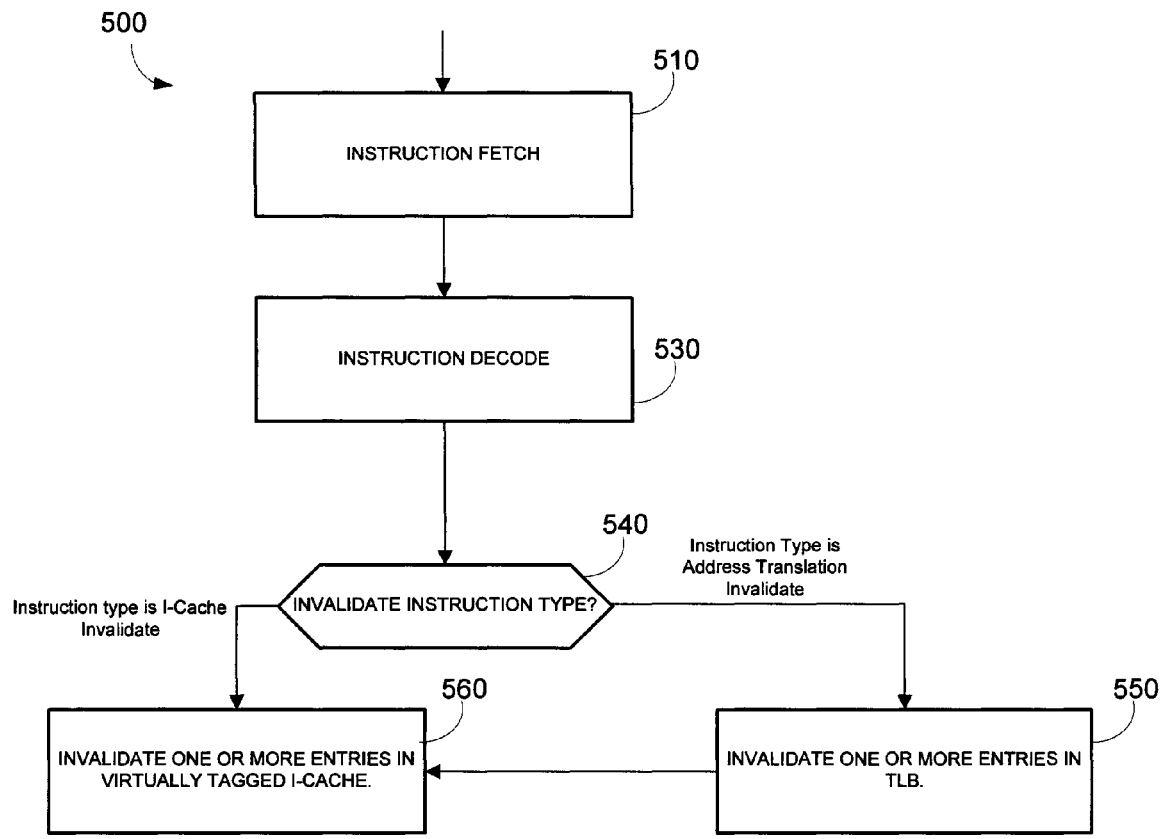
FIG. 5 is a flow diagram illustrating a method for a virtually tagged instruction cache to operate as if it were a physically tagged instruction cache from a software program point of view.

FIG. 5 is a flow diagram illustrating a method 500 for making a virtually tagged instruction cache operate as if it were a physically tagged instruction cache from a software program point of view. At function block 510, the method fetches an instruction.

The fetched instruction proceeds to instruction decode 530 where the fetched instruction is decoded. At block 540, the method determines the type of instruction. If the type of instruction is an address translation invalidate instruction, the method proceeds to block 550 which invalidates one or more entries in a TLB such as TLB 128 in accordance with the address translation invalidate instruction. The method further proceeds to block 560. At block 560, the method also invalidates one or more entries in the I-cache 122 in accordance with a mapping of address translation invalidate instructions such as defined in Table 1. Those skilled in the art will appreciate that the order in which block 550 and block 560 may be reversed without affecting the invalidation process. Returning to block 540, if the type of instruction is an I-cache invalidate instruction, the method proceeds to block 560 to invalidate one or more entries in the I-cache 122 in accordance with the I-cache invalidate instruction. Returning to block 540, if the type of instruction is not an invalidate instruction of any type, then return to block 510 to fetch the next instruction.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below.

What is claimed is:

1. An instruction cache system comprising:
    a virtually tagged instruction cache;
    a means for address translation, said means responsive to an address translation invalidate instruction; and
    control logic circuit configured to invalidate an entry in the virtually tagged instruction cache in response to the address translation invalidate instruction.

2. The instruction cache system of claim 1 wherein the means for address translation is a translation lookaside buffer (TLB).

3. The instruction cache system of claim 1 wherein the control logic circuit is configured to invalidate one or more entries in the virtually tagged instruction cache corresponding to an application service identifier (ASID) specified by the address translation invalidate instruction.

4. The instruction cache system of claim 1 wherein the control logic circuit is configured to invalidate a selective set of entries in the virtually tagged instruction cache corresponding to an index specified in the address translation invalidate instruction.

5. The instruction cache system of claim 1 wherein the control logic circuit comprises an input for receiving an enablement signal, the control logic circuit is configured to only invalidate the entry in the virtually tagged instruction cache in response to the address translation invalidate instruction after receiving the enablement signal.

6. The instruction cache system of claim 4 wherein the index comprises translated bit positions and untranslated bit positions, wherein each combination of values of the translated bit positions define thresholds in the virtually tagged instruction cache, wherein the control logic circuit is further configured to selectively invalidate entries at an offset from the defined thresholds, the offset specified by the value of the untranslated bit positions.

7. The instruction cache system of claim 1 disposed in a processor.

8. A method for a virtually tagged instruction cache to operate as if it were a physically tagged instruction cache from a software program point of view, the method comprising:
    receiving an address translation invalidate instruction; and
    invalidating less than all entries in a virtually tagged instruction cache in response to the address translation invalidate instruction.

9. The method of claim 8 wherein invalidating the entry in the virtually tagged instruction cache further comprises:
    invalidating one or more entries corresponding to an application service identifier (ASID) specified by the address translation invalidate instruction.

10. The method of claim 8 wherein invalidating the entry in the virtually tagged instruction cache further comprises:
    invalidating a set of selective entries corresponding to an address specified by the address translation invalidate instruction.

11. The method of claim 8 wherein invalidating the entry in the virtually tagged instruction cache further comprises:
    receiving an enablement signal; and
    invalidating the entry in the virtually tagged instruction cache after receipt of the enablement signal.

12. The method of claim 8 wherein invalidating the entry in the virtually tagged instruction cache further comprises:
    receiving an instruction cache invalidate instruction specifying invalidation of a specific physical address; and
    flash invalidating the virtually tagged instruction cache in response to the instruction cache invalidate instruction.

13. A control logic circuit for directing a virtually tagged instruction cache to operate as if it were a physically tagged instruction cache from a software program point of view, comprising:
    a first input for receiving an address translation invalidate instruction; and
    a means for generating control signals to invalidate an entry in the virtually tagged instruction cache in response to the address translation invalidate instruction.

14. The control logic circuit of claim 13 further comprising:
    a second input for receiving an instruction cache invalidate instruction wherein the means for generating control signals to invalidate an entry in the virtually tagged instruction cache is also responsive the instruction cache invalidate instruction.

15. The control logic circuit of claim 14 further comprising:
    an third input for disabling the means for generating control signals to invalidate the less than all entries in the virtually tagged instruction cache in response to the address translation invalidate instruction.

16. A computer-readable medium having a computer program, which when executed by at least one processor, operates to execute instructions in a processor for a virtually tagged instruction cache to operate as if it were a physically tagged instruction cache, the computer program comprising:
    instructions for receiving an address translation invalidate instruction; and
    instructions for invalidating less than all entries in a virtually tagged instruction cache in response to the address translation invalidate instruction.

17. An instruction cache system comprising:
a virtually tagged instruction cache;
a means for translation, said means responsive to an address translation invalidate instruction, the address translation invalidate instruction specifying invalidation of a specific physical address or a specific virtual address associated with the specific physical address; and
control logic circuit configured to flash invalidate the virtually tagged instruction cache in response to the address translation invalidate instruction.

18. A method for a virtually tagged instruction cache to operate as if it were a physically tagged instruction cache from a software program point of view, the method comprising:
receiving an address translation invalidate instruction specifying invalidation of a specific physical address or a specific virtual address associated with the specific physical address; and
flash invalidating a virtually tagged instruction cache in response to the address translation invalidate instruction.

19. A computer-readable medium having a computer program, which when executed by at least one processor, operates to execute instructions in a processor for a virtually tagged instruction cache to operate as if it were a physically tagged instruction cache, the computer program comprising:
instructions for receiving an address translation invalidate instruction specifying invalidation of a specific physical address or a specific virtual address associated with the specific physical address; and
instructions for flash invalidating a virtually tagged instruction cache in response to the address translation invalidate instruction.

20. The instruction cache system of claim 2, wherein the control logic circuit is further configured to invalidate one or more of the TLB.

21. The method of a claim 8 further comprising, invalidating one or more entries of an address translation means in response to the address translation invalidate instruction.

22. The control logic circuit of claim 13, further comprising means for generating control signals to invalidate one or more entries of an address translation means in response to the address translation invalidate instruction.

* * * * *